US 9,302,182 B2

(12) United States Patent
Ur et al.

(10) Patent No.: US 9,302,182 B2
(45) Date of Patent: Apr. 5, 2016

(54) METHOD AND APPARATUS FOR CONVERTING COMPUTER GAMES BETWEEN PLATFORMS USING DIFFERENT MODALITIES

(75) Inventors: Shmuel Ur, Misgav (IL); Tal Raviv, Hod Hasharon (IL)

(73) Assignee: SIDE-KICK LTD, Bney Brak (IL)

( * ) Notice: Subject to any disclaimer, the term of this patent is extended or adjusted under 35 U.S.C. 154(b) by 772 days.

(21) Appl. No.: 13/478,113

(22) Filed: May 23, 2012

(65) Prior Publication Data
US 2013/0316828 A1  Nov. 28, 2013

(51) Int. Cl.
| | | |
|---|---|---|
| A63F 9/24 | (2006.01) | |
| A63F 13/00 | (2014.01) | |
| A63F 13/20 | (2014.01) | |
| A63F 13/22 | (2014.01) | |
| A63F 13/40 | (2014.01) | |

(52) U.S. Cl.
CPC .............. *A63F 13/20* (2014.09); *A63F 13/06* (2013.01); *A63F 13/10* (2013.01); *A63F 13/22* (2014.09); *A63F 2300/105* (2013.01); *A63F 2300/1087* (2013.01); *A63F 2300/209* (2013.01); *A63F 2300/6009* (2013.01)

(58) Field of Classification Search
CPC ....... A63F 13/22; A63F 13/23; A63F 13/235; A63F 13/42; A63F 2300/1018; A63F 2300/1025; A63F 2300/1031; A63F 2300/6045
See application file for complete search history.

(56) References Cited

U.S. PATENT DOCUMENTS

| | | | | |
|---|---|---|---|---|
| 4,976,435 | A | * | 12/1990 | Shatford ............ A63B 24/0087 345/156 |
| 5,317,505 | A | | 5/1994 | Karabed et al. |
| 5,838,307 | A | * | 11/1998 | Bouton .................... A63F 13/06 345/157 |
| 5,896,125 | A | * | 4/1999 | Niedzwiecki ........... A63F 13/02 345/156 |
| 5,963,671 | A | * | 10/1999 | Comerford et al. ........... 382/230 |
| 6,038,534 | A | * | 3/2000 | Richards ...................... 704/275 |
| 6,098,130 | A | * | 8/2000 | Wang ............................ 710/100 |
| 6,488,584 | B2 | * | 12/2002 | Nelson .................... A63F 13/06 463/1 |
| 6,615,299 | B1 | * | 9/2003 | Chu ........................ G06F 3/023 463/36 |
| 6,643,721 | B1 | * | 11/2003 | Sun ........................ G06F 3/0481 710/10 |
| 6,727,884 | B1 | * | 4/2004 | Leatham et al. ............... 345/156 |

(Continued)

FOREIGN PATENT DOCUMENTS

| | | |
|---|---|---|
| CN | 101753872 A | 6/2010 |
| WO | 2005/113086 A1 | 1/2005 |

*Primary Examiner* — Milap Shah
(74) *Attorney, Agent, or Firm* — Smith Tempel; Gregory Scott Smith

(57) ABSTRACT

A method, apparatus and product useful for converting computer games between platforms using different modalities. The method comprising receiving a capture of a player playing at least a part of a game on a first platform using a first modality, wherein the game comprises at least a User Interface (UI) module and a logic module; receiving an intercepted logic command call made by the UI module of the game to the logic module of the game; associating the intercepted logic command call with a user action in the game as played using the first modality; and wherein based on the associated user actions and intercepted logic command calls, the game can be modified to use a second modality.

16 Claims, 4 Drawing Sheets

(56) References Cited

U.S. PATENT DOCUMENTS

| | | | | |
|---|---|---|---|---|
| 7,116,310 B1* | 10/2006 | Evans | G06F 3/0238 | 345/156 |
| 7,631,124 B2* | 12/2009 | Lockhart | G06F 3/038 | 710/62 |
| 7,669,770 B2* | 3/2010 | Wheeler | G06F 3/0238 | 235/472.01 |
| 7,765,539 B1* | 7/2010 | Elliott | G06F 8/53 | 717/145 |
| 8,214,539 B1* | 7/2012 | Kulanko | G06F 3/038 | 702/125 |
| 2003/0083130 A1* | 5/2003 | Toyoshima | | 463/36 |
| 2003/0125099 A1* | 7/2003 | Basson et al. | | 463/7 |
| 2004/0204241 A1* | 10/2004 | Houston | | 463/37 |
| 2005/0176505 A1* | 8/2005 | Stanley | | 463/37 |
| 2005/0282633 A1 | 12/2005 | Nicolas et al. | | |
| 2006/0252542 A1* | 11/2006 | Nicely | | 463/36 |
| 2009/0048018 A1 | 2/2009 | Sayyadi et al. | | |
| 2009/0187886 A1 | 7/2009 | Peck et al. | | |
| 2010/0081507 A1* | 4/2010 | Finocchio | | 463/37 |
| 2010/0151946 A1 | 6/2010 | Wilson et al. | | |
| 2011/0034248 A1* | 2/2011 | Grever et al. | | 463/36 |

* cited by examiner

METHOD AND APPARATUS FOR CONVERTING COMPUTER GAMES BETWEEN PLATFORMS USING DIFFERENT MODALITIES

TECHNICAL FIELD

The present disclosure relates to computer games in general, and to converting computer games between gaming platforms using different modalities, in particular.

BACKGROUND

A computer game is a general term for an electronic game that involves human interaction with a user interface to generate feedback on any type of a display device, such as a raster display device, an LCD, or the like, associated with a television, a computer display, a handheld device, or others. Preferably, the computer game is played by a user for recreational purposes.

The electronic systems used to play video games are generally referred to as platforms or gaming platforms, and may include personal computers, video game consoles, handheld devices or the like.

Some games utilize an input device, also referred to as a game controller, with which a human player may manipulate the game. Known game controllers include standard input output (I/O) devices such as a keyboard or a pointing device (e.g., a mouse), dedicated gaming devices such as joystick, or motion-detection held devices held by the player such as WII™ controllers. Other gaming platforms, such as Microsoft Kinect™, use a motion sensor game controller which need not be held or otherwise carried by the player. Motion-sensor game controller may utilize a camera such as a webcam or other sensor for sensing the user's motions without requiring the user to hold or touch a physical controller, and pass the user's motions to the video game console. Some gaming platforms may also enable oral commands by the player, use of a phone interface and a touch screen, or the like.

Developing computer games is a labor intensive process. Generally, the developer has to provide a user interface (UI) module, for receiving the user's motions or activities and generate corresponding commands or instructions; a logic module for receiving and interpreting the user's commands and determining the course of the game; and a display module for displaying the game on the display device, including for example displaying characters, objects, scenes, menus or other selection options for a user, or the like.

A developer that has developed a computer game, may wish to maximize his or her revenues by offering a corresponding game adapted for other platforms. For example, a developer may wish to offer a game developed for a WII™ platform also to a Kinect™ or Sony PS3™ platforms.

Another need for porting may arise from a provider of platforms or devices, such as a mobile device, a new gaming platform, or the like, who wishes to supply the platform with a multiplicity of games. However, the provider may wish that at least some of the games be known and attractive to players, and in addition may wish to reduce time to market and obtain a significant number of games as soon as possible. For achieving this goal, porting games existing for other platforms may provide an efficient solution.

The ported game should provide a player with an experience which is as similar as possible to the original game experience.

However, porting and specifically porting the UI module may pose significant challenges, among which is that the new platform may not have the same or even corresponding input devices to those of the original platform. For example, a player playing a WII™ game may provide input to the game by waving his hands or performing other three dimensional (3D) motions. However, a Sony PS3™ only has a controller with some buttons or other controls which may be pressed or otherwise activated.

BRIEF SUMMARY

One exemplary embodiment of the disclosed subject matter is a computer-implemented method performed by a computerized device, comprising: receiving a capture of a player playing at least a part of a game on a first platform using a first modality, wherein the game comprises at least a User Interface (UI) module and a logic module; receiving an intercepted logic command call made by the UI module of the game to the logic module of the game; associating the intercepted logic command call with a user action in the game as played using the first modality; and wherein based on the associated user actions and intercepted logic command calls, the game can be modified to use a second modality.

Another exemplary embodiment of the disclosed subject matter is an apparatus having a processing unit and a storage device, the apparatus comprising: a captured game receiving component for receiving a capture of a player playing a game on a first platform using a first modality; an intercepted command receiving component for receiving an intercepted logic command call made by a UI module of the game as played using the first modality to a logic module of the game; a command-action correspondence retrieval component for associating the intercepted logic command call with a user action in the game as played using the first modality; and wherein based on the associated user actions and intercepted logic command calls, the game can be modified to use a second modality.

Yet another exemplary embodiment of the disclosed subject matter is a computer program product comprising: a non-transitory computer readable medium retaining program instructions, which instructions when read by a processor, case the processor to performs the steps of: receiving a capture of a player playing at least a part of a game on a first platform using a first modality, wherein the game comprises at least a User Interface (UI) module and a logic module; receiving an intercepted logic command call made by the UI module of the game to the logic module of the game; and associating the intercepted logic command call with a user action in the game as played using the first modality; and wherein based on the associated user actions and intercepted logic command calls, the game can be modified to a second modality.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1A:
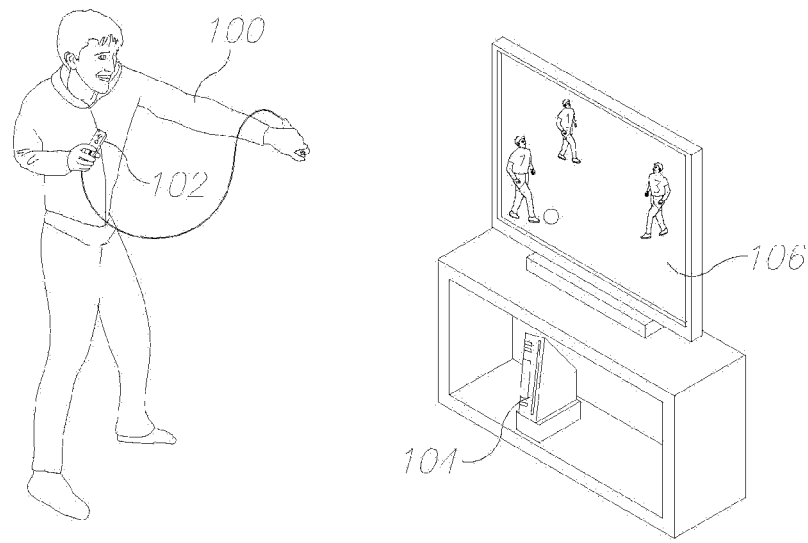
FIG. 1A, FIG. 1B and FIG. 1C show a conceptual illustration of a computer game ported from a first platform to a second and third platforms, in accordance with some embodiments of the disclosed subject matter.

The disclosed subject matter is described below with reference to flowchart illustrations and/or block diagrams of methods, apparatus (systems) and computer program products according to embodiments of the subject matter. It will be understood that some blocks of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is enabling relatively easy porting of a computer game from a first platform to a second platform. Particular challenges are encountered when porting the User Interface (UI) module of a game. The UI module may be responsible for capturing the user's activities, motions or other input, interpreting them, generating based thereon commands, instructions, selections or other inputs, and transferring the input to a logic module which manages the game. The situation is even more challenging when the game is to be ported to a platform having input devices of a different modality than those of the original platform.

A modality of the input device is a scheme of capturing user interactions. Some examples of modalities may be: a keyboard modality, in which a stroke of a button is used as an input action; a joystick modality, in which a joystick and optionally press of buttons are used as input actions, a pointing device modality, in which a 2D pointing device, such as an IR transmitter or a mouse, is used to provide coordinates as input values as well as selection input (e.g., clicking on a mouse button); a touch modality, in which a 2D touch device, such as a touch screen or a multi-touch screen, is used to provide one or more 2D coordinate as input; a body-worn motion sensing modality, in which 3D motion sensing is performed using a motion device held or worn by the player to provide 3D gestures as inputs; and a remote motion sensing modality, in which 3D motion sensing is performed remotely, such as using a camera or other sensor, to capture 3D gestures as inputs.

The term modality may also refer to the user interface, e.g., the set of actions enabled by or associated with an input device. For example, it may be desirable to enable different actions or action sets for the same game using the same input device, but for people having different preferences or disabilities. For example, a person may be unable to, or prefer not to perform kick actions when playing a certain game, but rather perform other motions or actions, for example with the hands, which will have the same effect on the game. In some examples, available voice-activated actions of a modality may be activated by different actions for enabling speech-impaired players to enjoy the game. Games can be converted to be more comfortable for right-handed or left-handed players, or the like.

When porting games, and in particular in case the original platform utilizes a remote motion sensing modality, porting to a different platform may be a complex task which cannot be easily accomplished by input simulation (e.g., simulating a video input for the remote motion sensing modality's camera). Furthermore, in such a case, it may be technically challenging to port the game to a platform utilizing a different input modality.

It will be noted that capturing a user's motion and automatically analyzing them to determine gestures performed by a user that are relevant to the game is generally considered a complex task, which may require utilization of complex algorithms.

It will be appreciated that the situation may be less challenging with games in which the UI module is separated from the other modules and uses an accessible Application Program Interface (API) to be operatively coupled with the logic module and invoke functionalities thereof.

Furthermore, it may be less challenging to port a game in which full and accurate documentation is available. Such documentation may describe the different manners to invoke the logic module including, without limitation, the effects of such invocation, and its context in different states of the game. However, this is seldom the situation, and full documentation is rarely available.

Another technical problem dealt with by the disclosed subject matter is the need for developing and programming computer games in a manner that will enable relatively easy conversion to additional platforms, including platforms having input devices of a different modality.

It will be appreciated that a computerized game may require bidirectional communication between the UI module and the logic module of a game. While the UI module notifies the logic module about the actions and activities of the user, the logic module may provide to the UI module information such as the commands which the UI module is allowed to send to the logic module in accordance with the current state, or the like.

It will be appreciated that a computerized game may require that action parameters are provided by the UI module to the logic module. For example, if the user performed an action intending that a character or an object in the game will move, the movement parameters such as direction, speed or others may have to be provided. In addition, it may have to be indicated whether the movement is absolute or relative.

One technical solution relates to developing computer games that are easy to port to platforms which use different modalities, by separating the UI module from the logic module, such that the logic module is accessed via API commands called by the UI module. It will be appreciated that the disclosed subject matter may be applied when porting between any two system configurations (e.g., the new platform may be the same or different from the original platform; the input device may be the same or different from the original input device; both the platform and the input device may be the same but the actions or motions enabled by the two input devices for the same game may differ).

When it is desired to port the game to another modality, a different UI module may be developed, which uses the same interface to the logic module, such that no changes have to be introduced to the logic module.

If no sufficient documentation exists to how the API is to be used, and which function would be called for achieving required objects of the game, then the following steps may be taken:

A player is playing the game using the original modality for a period of time. The player may attempt to use many of the features and options of the game, so as to invoke as many functions of the API as possible. While the player is playing, his or her actions are captured and stored, for example by a web camera, an external camera, or any other camera or sensor. In addition, the communication between the UI module and the logic module may be intercepted or otherwise monitored. The communication between the UI module and the logic module may be logged. Logging may be enabled by adding logging commands to source code commands which call the logic module if source code is available; by identifying the object code instructions which call the logic module and instrumenting these commands with logging commands, or the like. Each call in the log may be associated with a time stamp that may correspond to a time in the recorded game.

The logic module API commands invoked during the game or games may be retrieved from the log. The user actions or activities that invoked the calls to these commands may also be retrieved, using the captured user actions as taken at the time the call was made. Corresponding user actions may be designed for invoking these commands in the new modality. For example, in order to invoke the same action is invoking in a game executed on a WII™ platform having a body-worn motion sensing modality, a press on an "R2" button in a PS3™ platform having a joystick modality, may be selected.

The user actions on the new modality may be designed to be as close as possible to the actions in the original modality, so as to provide a player with a uniform experience for the same game in two modalities, to the extent possible.

For the logic module commands which are not called during the game as captured, any motion, gesture, or action can be selected. An educated guess can be suggested based on the command name, if available. Alternatively, these commands may be ignored and not supported on the new modality. It may be assumed that if the player played the game long and intensively enough, and did not get to call these commands they may be unnecessary and ignored.

In some exemplary embodiments, based on a determination that no sufficient coverage of logic module commands was reached, the player may be asked to continue recording his gaming activity until full or sufficient coverage thereof is reached.

In some exemplary embodiments, the communication between the UI module and the logic module may be bi-directional. For example, if two identical or similar actions of the player invoke different commands at different circumstances, then the logic module may have to notify the UI module of the currently possible states or actions. Thus, when an action, such as a hand gesture, can be interpreted by the UI module in more than one way, the relevant manner may be retrieved in accordance with the relevant states. In some exemplary embodiments, in some states, only a portion of the actions may be enabled. The UI module may be informed of a dictionary of enabled actions based on an invocation from the logic module providing said dictionary.

In some exemplary embodiments, the UI module can call logic commands which require parameters. Parameters, such as distance parameters may be supplied in a relative or absolute manner. The UI module may or may not be aware of the way the parameters are to be supplied, and therefore may or may not convert the parameters to correspond to the required manner.

One technical effect of utilizing the disclosed subject matter is the provisioning of computer games in a methodology that separates their UI part from other parts and makes it easy to convert them to different modalities.

Another technical effect of the disclosed subject matter relates to a relatively fast and efficient conversion of games from one modality to another. Such conversion may relate to converting from platforms using motion sensing modalities to platforms using other, potentially simpler, modalities, or using a different motion sensing modality. When porting from a motion sensing modality, the conversion does not require the analysis of captured motions and their adjustment or translation to another modality and in particular translating a 3D motion to a 2D motion. Additionally or alternatively, the disclosed subject matter may avoid a need to simulate input to the original modality, a task which may be complex in case of a motion sensing modality.

The method and apparatus also does not require the developer to understand how the game is programmed but only to translate the actions as performed by a player to corresponding actions in the new modality.

Yet another technical effect of the disclosed subject matter relates to providing a developer with tools for easily converting a multiplicity of games to a new modality.

The developer may create a function collection or a library that recognize actions in the new modality, such as hand wave, kick, pressing any button, or the like. Any such action may then be associated with one or more commands in each of a multiplicity of ported game, thus significantly reducing the effort associated with converting the UI module for a multiplicity of games.

It will be appreciated that the disclosed method and apparatus provide for generally fast and efficient translation of movements and other actions between the different platforms which use different modalities. The method and apparatus provide the collection of commands used during the game, and relatively efficient manner of identifying the action that invoked each command, so that corresponding actions can be assigned in the ported game, so as to provide a user familiar with the original modality a similar game in the ported platform using the new modality.

Figure 1B:
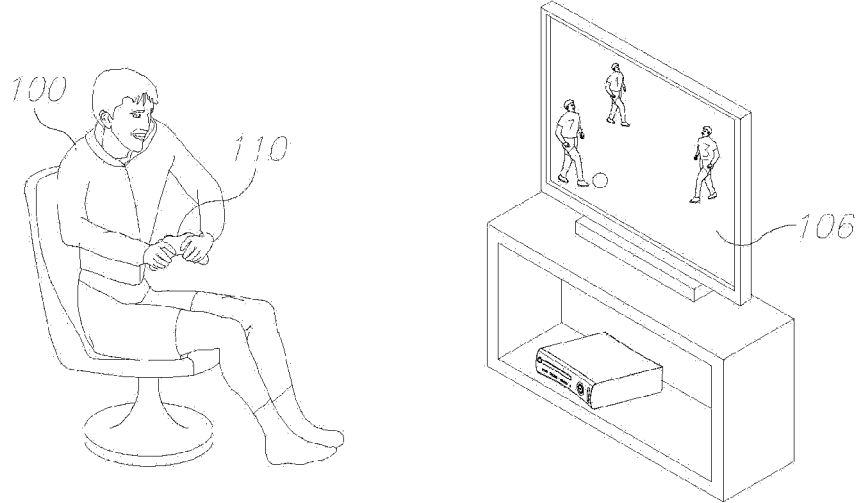
Figure 1C:
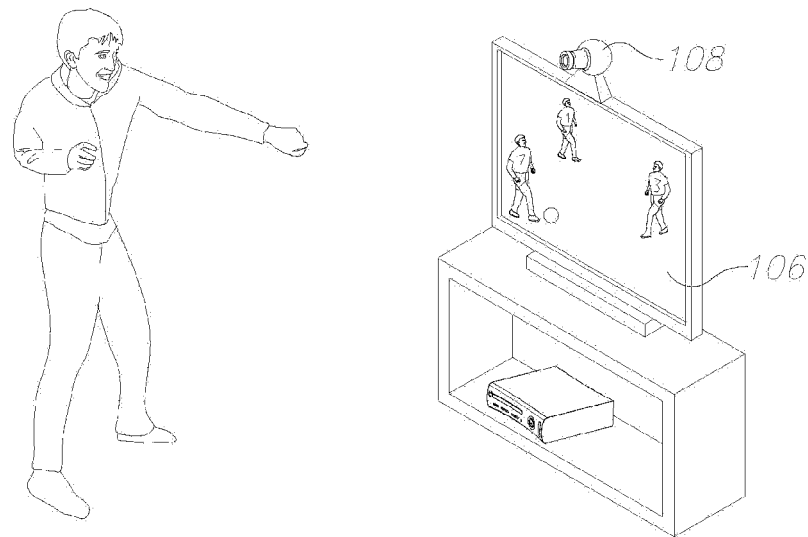

Referring now to FIGS. 1A, 1B and 1C, showing an illustrative example of a game converted from one platform using a particular modality to others. FIG. 1A shows a player 100 holding a WII™ controller 102 and playing a game using a WII™ platform 104, wherein the game is displayed on a display device 106. It may be desired to port the game to other platforms using a different modality in a relatively easy and efficient manner, and in such a way that will provide a user who knows the game a familiar feeling, so that he or she does not have to get training in the game but can rather start playing almost immediately.

FIG. 1B shows player 100 playing the same game using a PS3™ platform using a joystick controller 110, wherein motions the player performed using the WII™ controller 102 were converted to actions using the joystick controller 110.

FIG. 1C shows player 100 playing the same game using a Microsoft Kinect™ system in which the user's motions are captured by camera 108. Since both the WII™ and Kinect platforms use motion-sensing, or 3D, modalities, the motions to be performed when playing with the Kinect™ system may be as similar as possible to the motions when playing with the WII™ system, without having to automatically analyze the motions performed by the user.

It will be appreciated that FIGS. 1A, 1B and 1C are exemplary only, and that the same method and apparatus may be employed for converting between any two gaming platforms. For example, games can be ported from platforms displaying on stationary displays such as display 106, into mobile devices in which the controller and the display are embedded in the same device. In some embodiments, the method and apparatus may be used for converting from a body-worn motion sensing modality or a remote motion sensing modality to simpler modalities such as a keyboard modality, a joystick modality, a pointing device modality, a touch modality or others, or from one motion sensing modality to another. The method and apparatus may also be used for converting games using 2D modalities to games using 3D modalities.

Figure 2:
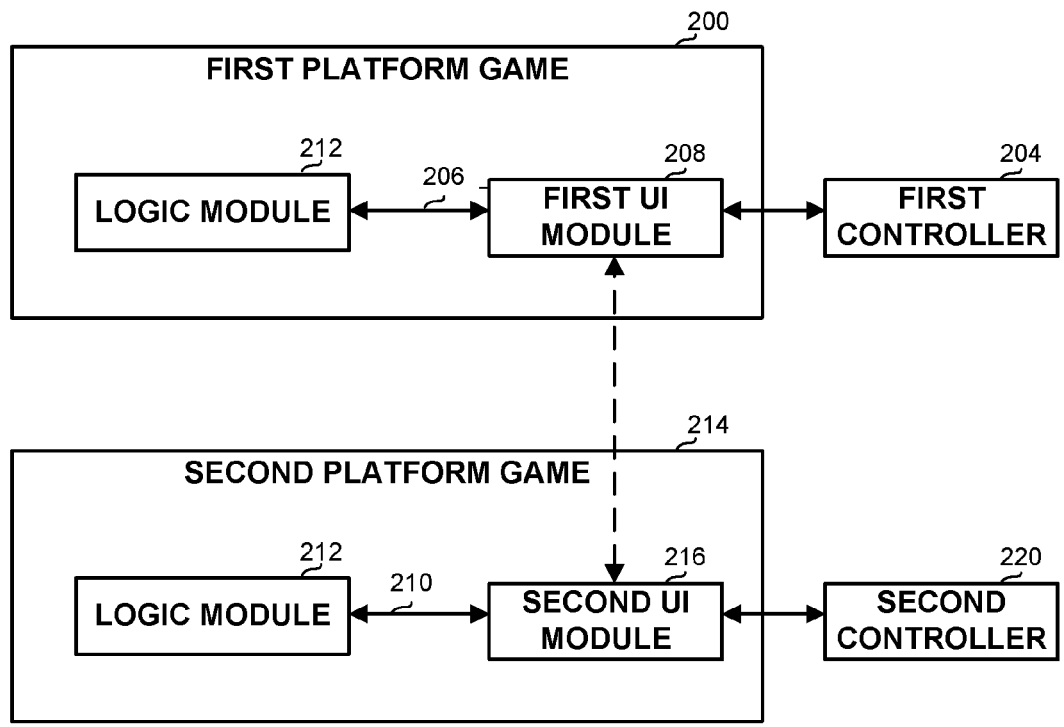
FIG. 2 shows a block diagram illustrating exemplary components of a game in two platforms and porting therebetween, in accordance with some exemplary embodiments of the disclosed subject matter.

Referring now to FIG. 2, showing a block diagram illustrating exemplary components of a game in two platforms, and porting therebetween.

First platform game 200 is designed for a first platform, and may be played using one or more controllers such as first controller 204. As an example, the first controller may be of any motion sensing modality, such as a body-worn motion sensing modality, a remote motion sensing modality, or the like. However, first controller 204 may also be of any other modality.

First platform game 200 comprises a first User Interface (UI) module 208 for receiving notifications from first controller 204, such as motion notifications, button press notifications, or any other notification which may be provided by first controller 204. The notifications generally provide indications for actions taken by a user of the game, using first controller 204.

First UI module 208 may analyze the notifications, and may issue commands over channel 206 to logic module 212. Channel 206 may be virtual, such as a function call, or physical such as a Bus. The commands may be issued based on the notifications received from first controller 204 and optionally one or more internal states of first UI module 208. In some exemplary embodiments, first UI module 208 may comprise implement complex algorithms, such as for identifying different objects and body parts, identifying gestures, and their characteristics (e.g., speed, acceleration, direction), or the like.

Logic module 212 is responsible for managing the game by applying the game flow, rules or logic, responding to the received commands, issuing display commands to first UI module 208 to reflect the status or flow of the game, keeping scores, managing player accounts, or the like. In some exemplary embodiments, logic module 212 may be responsible for providing user output such as by displaying a picture on a screen (not shown). Additionally or alternatively, output to the user may be provided by the first controller 204 such as recoil feedback. The logic module 212 may provide an instruction to the first UI module 208 to provide the output to the first controller 204.

It may be desired to provide the same game also to players of a second platform, by providing a second platform game 214. Second platform game 214 may be played using a second controller 220 of a modality different from the modality of first controller 204. It may also be desired to provide the game such that the user's actions may be as similar as possible to the actions taken when using first controller 204.

In some embodiments, logic module 212 may remain substantially the same for any platform, since the rules and flow of the game should not change. If required, automatic or semi-automatic porting between different computing platforms or different programming languages may be employed, such as by compiling the source code for the second platform.

Since second controller 220 is different from first controller 204, it may be able to provide different types of notifications. It is thus required to adapt first UI module 208 to the second platform and provide second UI module 216, which will issue the same commands to logic module 212 as issued by first UI module 208, for corresponding actions.

In some embodiments, the commands sent by first IO module 208 to logic module 212 through channel 206 are intercepted and the corresponding user actions of a user using first controller 204 are captured. The actions with first controller 204 and the commands sent by first UI module 208 to logic module 212 may then be correlated. Then, actions of second controller 220 which are as similar as possible to the captured actions may be associated with the commands, such that given such action, second UI module 216 issues the same command as the command issued by first UI module 208.

Using the same or substantially similar logic module 212 for the two platforms, and easily porting first UI module 208 into second UI module 216 enables porting of the game to the second platform in a relatively easy manner, and without requiring intensive knowledge of the game or its program code.

Figure 3:
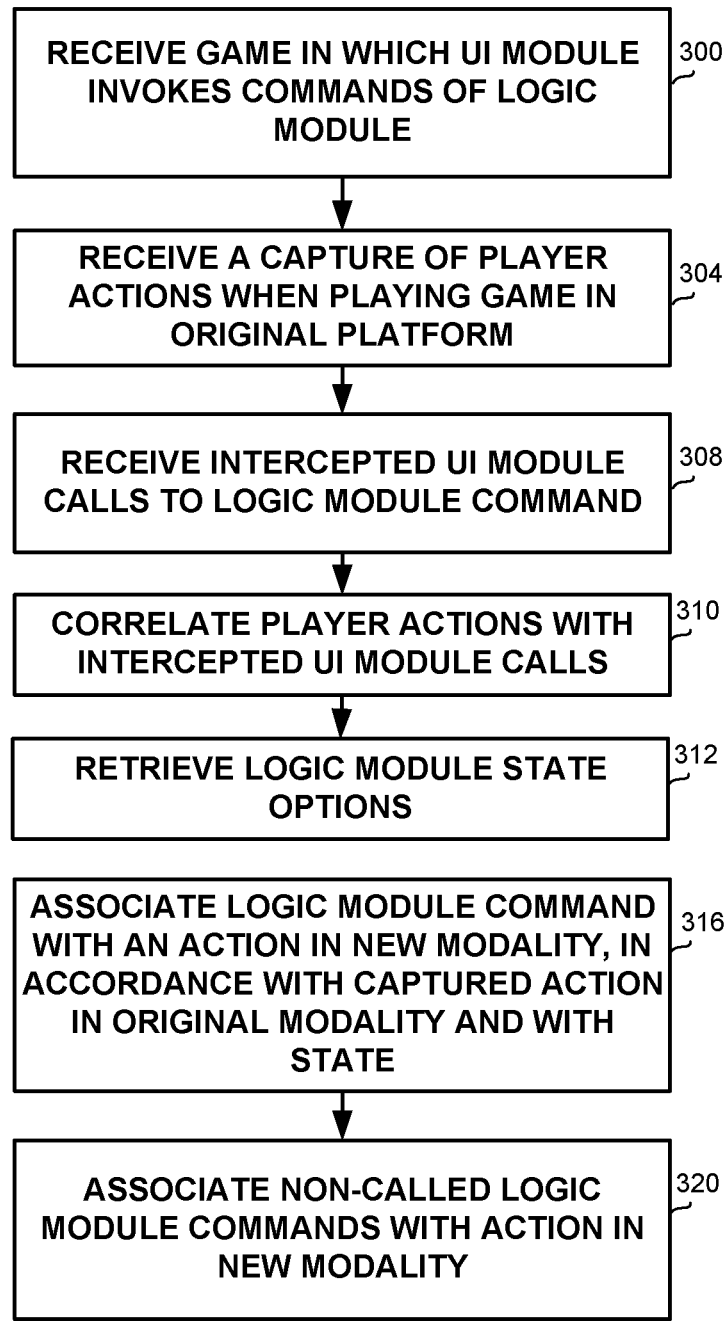
FIG. 3 shows a flowchart of steps in a method for porting a computer game from a platform using a first modality to a platform using a second modality, in accordance with some exemplary embodiments of the disclosed subject matter.

Referring now to FIG. 3, showing a flowchart comprising steps in a method for porting a computer game from a platform using a first modality to a platform using a second modality.

On step 300, a game in which a UI module makes calls to a logic module may be received. The game may be provided by any party, in any programming language or in object code, and may be used in any one or more gaming platforms using any modality, such as WII™, PlayStation3™, any tablet, laptop or desktop computer, handheld device, smartphone, or the like.

The term UI module refers to any function, procedure, module, static library, dynamic library or any other collection of computer instructions adapted to receive user actions with or without a dedicated controller and to output a call to one or more commands of a logic function, procedure, module, static library, dynamic library or any other collection of computer instructions adapted to manage the game, provide reactions to user actions, keep score, keep user registrations, or the like.

On step 304, captured player actions may be received, in which the player is playing the game using the original modality. The player may be instructed to operate as many options of the game as possible, to play in extreme situations and many modes, or the like, in order to invoke as many as possible of the game's logic module commands. The player actions may be captured using a camera, a web camera, or any other sensor.

On step 308, which may or may not be performed concurrently with step 304, an interception of the calls made by the UI module to the logic module during playing may be received. The command calls may be intercepted by retrieving them from a log file, or if such log is unavailable by introducing instrumentation commands to the UI module computer code.

On step 310, player actions and intercepted UI module calls may be correlated. Correlation may be based on both a player action and an intercepted UI module call being captured at the same time. Capturing time may be determined based on a timestamps associated with recording of player actions and based on timestamps associated with logged UI module calls.

On optional step 312, state options may be retrieved from the logic module. For example, it may be retrieved that at state "Play", a "kick" command or a "wave" command may be invoked, while in "settings" mode only a "select" command or a "next" command may be invoked. In some exemplary embodiments, calls by the logic module to the UI module may be intercepted, such as by reviewing a log file or using a snipping mechanism. The logic module may invoke a function of the UI module that is operative to change the state to a desired state. An impact of a setting change may be determined, either automatically, manually or in combination thereof, based on the commands that the UI module invokes during the state.

On step 316, each command called by the UI module while the game is played may be associated with an action enabled by the new modality. The action may be selected to best imitate the action by the player in the original modality as captured on step 304, to provide a player using the new modality a familiar experience. Each action may be associated with one or more commands in association with the states, such that in "play" state a particular action may invoke a "kick" command while in "settings" mode a "select" command may be invoked.

On step 320, actions enabled by the new modality may be associated with logic commands which were not called by the UI module during the player's playing on step 308. The actions may be set to be associated with the command name if such name is available or meaningful. Alternatively, one or more such commands may not be associated with actions, under the assumption that if these commands were not encountered during intensive games, they may be unnecessary.

It will be appreciated that the user actions need to be recognized by the UI module of the new platform. Once an action is recognized, for example a kicking motion is identified as a "kick" action, the UI module may determine, in accordance with its current state, which logic command is associated with the "kick" action, and invoke that command. Motions may be identified, for example, by video processing while other actions such as pressed buttons may be straight forward to identify.

Using the method of FIG. 3, a user may port a UI module of a game as detailed above. The user may then leave the logic module as is if the original and new modalities are compatible, or use automatic or semi-automatic porting tools. The user may further program or use a display library for the new modality, which may be used for a multiplicity of games and other applications. Porting the UI, logic and display modules of a game comprises a significant part of the effort required for porting games, thus enabling the porting of a multiplicity of games between modalities in relatively short time, and without having to thoroughly understand each game.

Figure 4:
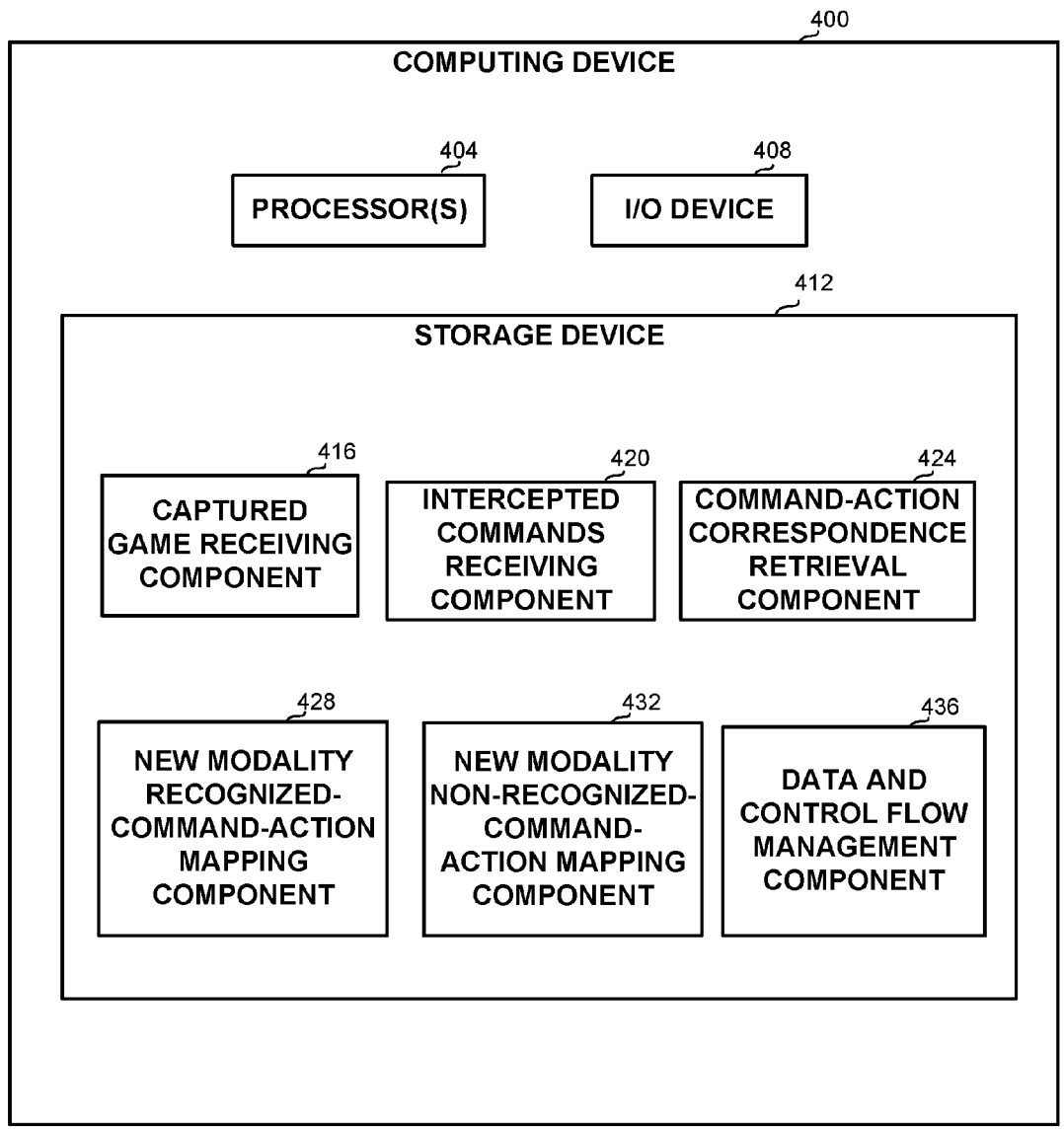
FIG. 4 shows a block diagram of components of an apparatus for porting a computer game from a platform using a first modality to a platform using a second modality, in accordance with some exemplary embodiments of the disclosed subject matter.

Referring now to FIG. 4, showing a block diagram of components of an apparatus for porting a computer game from a platform using a first modality to a platform using a second modality.

The environment comprises a computing device 400, which may comprise one or more processors 404. Any of processors 404 may be a Central Processing Unit (CPU), a microprocessor, an electronic circuit, an Integrated Circuit (IC) or the like. Alternatively, computing device 400 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 404 may be utilized to perform computations required by computing device 400 or any of its subcomponents.

In some embodiments, computing device 400 may comprise an input-output (I/O) device 408 such as a terminal, a display, a keyboard, an input device or the like to interact with the system, to invoke the system and to receive results. It will however be appreciated that the system can operate without human operation and without I/O device 408.

Computing device 400 may comprise one or more storage devices 412 for storing executable components, and which may also contain data during execution of one or more components. Storage device 412 may be persistent or volatile. For example, storage device 412 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 412 may retain program code operative to cause any of processors 404 to perform acts associated with any of the steps shown in FIG. 3 above.

The components detailed below may be implemented as one or more sets of interrelated computer instructions, loaded to storage device 412 and executed for example by any of processors 404 or by another processor. The components may be arranged as one or more executable files, dynamic libraries, static libraries, methods, functions, services, or the like, programmed in any programming language and under any computing environment.

In some embodiments the components loaded to storage device 412 may include captured game receiving component 416 for receiving a capture of a player as he or she plays the game on the original platform using the first modality. The captured game may comprise time stamps or other mechanism that enables retrieving the occurrences at the game at a particular point in time, whether as absolute time or as a point relative to the beginning of a game.

Storage device 412 may also comprise intercepted commands receiving component 420 for receiving commands intercepted during the time the player played the game. The commands may be commands of the logic module as called by the UI module.

Yet another component loaded to storage device 412 may be command-action correspondence retrieval component 424 adapted for associating a command call as was received by intercepted commands receiving component 420 with a user's action as received by captured game receiving component 416. The correspondence may be performed by associating a call according to its time stamp with an action captured at the same time or immediately prior to that time. Command-action correspondence retrieval component 424 may comprise a UI component which may assist a user in tracking the commands and seeking the relevant location in the captured game.

Storage device 412 may further comprise new modality recognized-command-action mapping component 428 for associating an action with a logic command, such that when the action is recognized the command is called. The action should be similar to the action in the original modality that invoked the logic command, to the extent possible.

Yet another component loaded to storage device 412 may be new modality non-recognized-command-action mapping component 432 for associating an action enabled by the new modality with a logic command which has not been called during play of the player, such that no corresponding action in the original modality is available. The command may thus be associated with any action. If the command name is available, an educated guess may be made of the role of the command. In some embodiments, the command may also be ignored.

Storage device 412 may also be loaded with data and control flow management component 436 for handling the control flow by activating the loaded components, tracking input and output, or the like, for example in accordance with the method detailed in association with FIG. 3 above.

It will be appreciated that storage device 412 may also be loaded with additional components, for example a component for retrieving how command parameters should be processed before being transferred with a command to the logic module, a component for receiving from the logic module an association of states and available commands at each state, or the like.

The disclosed method and apparatus enable the porting the UI part of a computerized game from a platform using a first modality to a platform using a second modality in a fast and efficient manner, without having to study how the game is programmed on the original platform, Even further, the method and apparatus enables a developer to develop a set of functions or modules for recognizing user actions performed using a new modality, and then efficiently port a multiplicity of games from a platform using an existing modality to a platform using a new modality.

It will be appreciated that the method and apparatus can also record user's spoken commands and transfer, process them with speech to text engine and transfer them as is to the new modality.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the parts of the disclosed subject matter may be embodied as a system, method or computer program product.

Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
   receiving a capture of a player playing at least a part of a game on a first platform using a first modality, wherein the game comprises at least a User Interface (UI) module and a logic module, wherein the UI module invokes the logic module in response to user inputs captured by the first platform using the first modality, wherein the UI module is configured to operate using the first modality, wherein the game, the UI module and the logic module are implemented in software stored on non-transitory computer-readable medium;
   receiving an intercepted logic command call made by the UI module of the game to the logic module of the game while the player is playing at least the part of the game on the first platform using the first modality;
   associating the intercepted logic command call with a user action in the game as played using the first modality; and
   modifying the game to use a second modality instead of the first modality, wherein said modifying comprises associating a second user action enabled by the second modality with the intercepted logic command call, whereby in response to the second user action captured when employing the second modality, the intercepted logic command call is made to the logic module of the game thereby simulating the user action in the first modality using the second user action in the second modality.

2. The computer-implemented method of claim 1, wherein each of the first modality and the second modality is selected from the group consisting of: a keyboard modality; a pointing device modality; a touch modality; a body-worn motion sensing modality; and a remote motion sensing modality.

3. The computer-implemented method of claim 1, wherein the first modality and the second modality utilize different input devices.

4. The computer-implemented method of claim 1, wherein the intercepted logic command call is retrieved by automatically adding one or more instructions to program instructions of the game, wherein the one or more instructions are configured to intercept logic command calls made by the UI module of the game to the logic module of the game.

5. The computer-implemented method of claim 1 further comprising associating a third user action enabled by the second modality with a non-intercepted logic command call, wherein the non-intercepted logic command call is not intercepted while the player playing the game on the first platform using the first modality.

6. The computer-implemented method of claim 1, further comprising translating command parameters to be provided to the logic module with the commands.

7. The computer-implemented method of claim 1, wherein said associating the intercepted logic command call with the user action is based on a correlation between a time in which the intercepted logic command call is intercepted and a time in which the user is recorded performing the user action.

8. The computer-implemented method of claim 1, further comprising retrieving a state option from the logic module while the player playing at least the part of the game on the first platform using the first modality, wherein the second user action enabled by the second modality is associated with the intercepted logic command call exclusively for the state option.

9. A computer program product comprising:
   a non-transitory computer readable medium retaining program instructions, which instructions when read by a processor, case the processor to performs the steps of:
   receiving a capture of a player playing at least a part of a game on a first platform using a first modality, wherein the game comprises at least a User Interface (UI) module and a logic module, wherein the UI module invokes the logic module in response to user inputs captured by the first platform using the first modality, wherein the UI module is configured to operate using the first modality, wherein the game, the UI module and the logic module are implemented in software;
   receiving an intercepted logic command call made by the UI module of the game to the logic module of the game while the player is playing at least the part of the game on the first platform using the first modality;
   associating the intercepted logic command call with a user action in the game as played using the first modality; and
   modifying the game to use a second modality instead of the first modality, wherein said modifying comprises associating a second user action enabled by the second modality with the intercepted logic command call, whereby in response to the second user action captured when employing the second modality, the intercepted logic command call is made to the logic module of the game thereby simulating the user action in the first modality using the second user action in the second modality.

10. A computerized apparatus comprising processor and a memory, wherein said processor is configured to perform the steps of:
    receiving a capture of a player playing at least a part of a game on a first platform using a first modality, wherein the game comprises at least a User Interface (UI) module and a logic module, wherein the UI module invokes the logic module in response to user inputs captured by the first platform using the first modality, wherein the UI module is configured to operate using the first modality, wherein the game, the UI module and the logic module are implemented in software stored on a non-transitory computer-readable medium;
    receiving an intercepted logic command call made by the UI module of the game to the logic module of the game while the player is playing at least the part of the game on the first platform using the first modality;
    associating the intercepted logic command call with a user action in the game as played using the first modality; and
    modifying the game to use a second modality instead of the first modality, wherein said modifying comprises associating a second user action enabled by the second modality with the intercepted logic command call, whereby in response to the second user action captured when employing the second modality, the intercepted logic command call is made to the logic module of the game thereby simulating the user action in the first modality using the second user action in the second modality.

11. The computerized apparatus of claim 10, wherein each of the first modality and the second modality is selected from the group consisting of: a keyboard modality; a pointing device modality; a touch modality; a body-worn motion sensing modality; and a remote motion sensing modality.

12. The computerized apparatus of claim 10, wherein the first modality and the second modality utilize different input devices.

13. The computerized apparatus of claim 10, wherein the intercepted logic command call is retrieved by automatically adding one or more instructions to program instructions of the game, wherein the one or more instructions are configured to intercept logic command calls made by the UI module of the game to the logic module of the game.

14. The computerized apparatus of claim 10, wherein said processor is further adapted to perform: associating a third user action enabled by the second modality with a non-intercepted logic command call, wherein the non-intercepted logic command call is not intercepted while the player playing the game on the first platform using the first modality, wherein said associating is based on user input explicitly indicating the association.

15. The computerized apparatus of claim 10, wherein said associating the intercepted logic command call with the user action is based on a correlation between a time in which the intercepted logic command call is intercepted and a time in which the user is recorded performing the user action.

16. The computerized apparatus of claim 10, wherein said processor is further configured to perform: retrieving a state option from the logic module while the player playing at least the part of the game on the first platform using the first modality, wherein the second user action enabled by the second modality is associated with the intercepted logic command call exclusively for the state option.

* * * * *